May 10, 1966 R. L. HOLLOWAY 3,250,347
BRAKE FOR GO-CART
Original Filed June 7, 1960 2 Sheets-Sheet 1
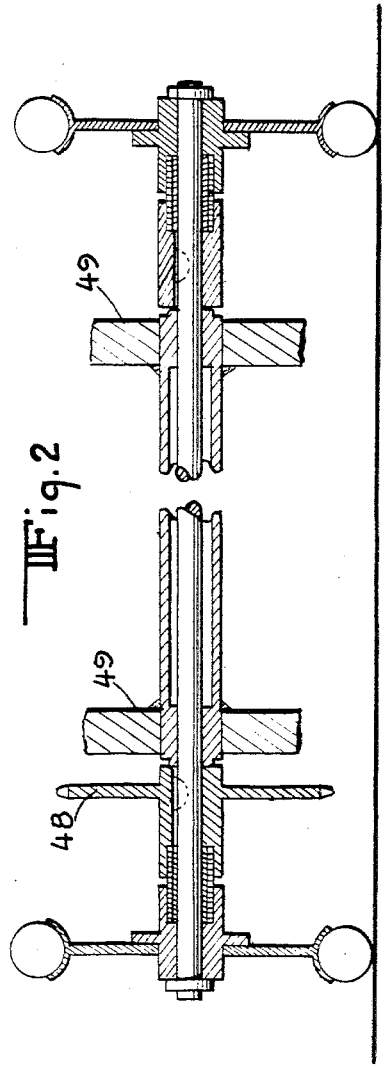
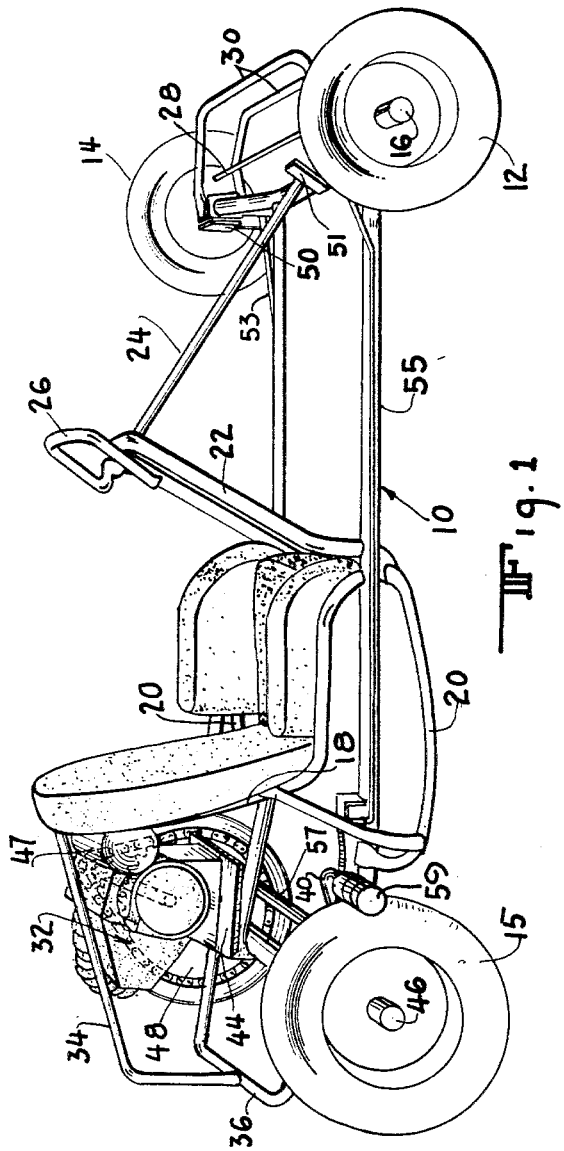
INVENTOR
ROBERT L. HOLLOWAY
BY
ATTORNEY

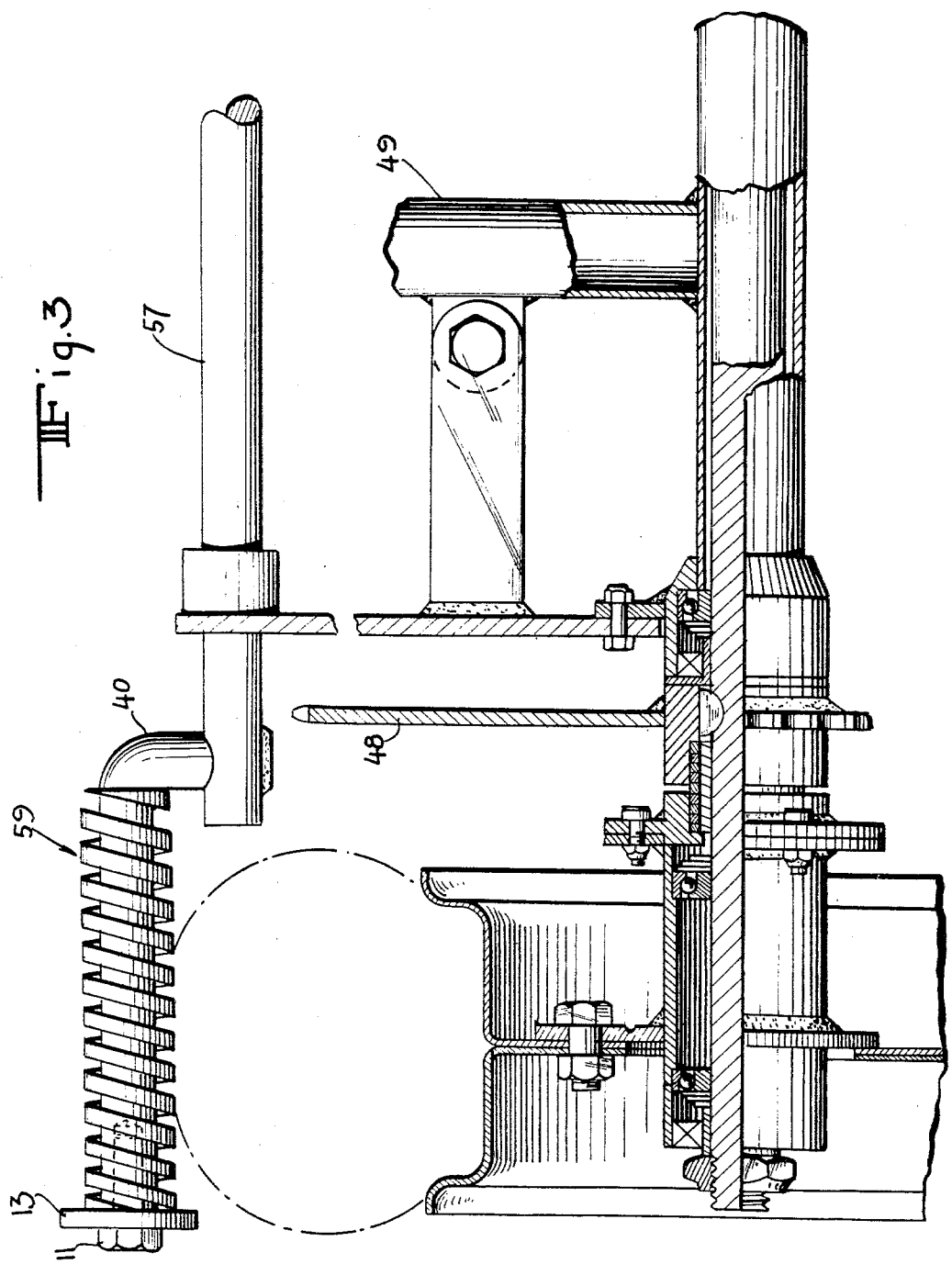

United States Patent Office 3,250,347
Patented May 10, 1966

3,250,347
BRAKE FOR GO-CART
Robert L. Holloway, Snyder, N.Y., assignor to American Machine & Foundry Company, a corporation of New Jersey
Original application June 7, 1960, Ser. No. 34,506, now Patent No. 3,169,597, dated Feb. 16, 1965. Divided and this application June 1, 1964, Ser. No. 379,061
2 Claims.  (Cl. 188—29)

This is a division of application Serial No. 34,506, filed June 7, 1960, now U.S. Patent No. 3,169,597 granted February 16, 1965.

This invention relates generally to small automotive vehicles known as carts, and more popularly as "go-carts." More specifically, the invention relates to brakes for such vehicles.

The object of this invention is to provide an improved self cleaning brake shoe, which is particularly well suited for use with "slick" or treadless racing tires and is readily replaceable for different types of tires.

Other objects and features of the invention will appear as the description of the particular embodiment selected to illustrate the invention progresses. In the accompanying drawings, which form a part of this specification, like characters of reference have been applied to corresponding parts throughout the several views which make up the drawings.

FIG. 1 is a perspective view of a go-cart which is adaptable for use with the present invention.

FIG. 2 is a sectional schematic arrangement of one embodiment of the drive system of the invention.

FIG. 3 is a fragmentary sectional view of one preferred design arrangement in accordance with the schematic of FIG. 2 and employing so called "scrubber" brakes.

Like reference characters identify like parts in the above views.

A vehicle on which the drive of the invention may be mounted is shown in FIGURE 1. This vehicle consists of a frame 10 having front wheels 12 and 14, mounted thereon in any suitable manner, as on a front axle 16. The frame has a rearwardly inclined portion 18 forming a back rest for the driver, and rails 20, suitably elevated from the ground to a plane above tubular frame 10 so as to form guards. Welded to frame 10 is forwardly inclined U-frame 22 supporting steering column 24, which is inclined upwardly and rearwardly, and has a steering wheel 26 secured to its free end.

The other end of column 24 is connected to a tie rod 28 for turning the front wheels. A front tubular bumper 30 is secured to the front axle 16. An engine 32 is secured to the vehicle by means of bracket 44, which is secured to the rear axle housing 54 and frame member 49. Tubular members 34 and 36 are attached to rear axle housing 54 and back member 18 to provide a rear 18.

The engine is preferably disposed in offset relation to the medial axis of the frame, but may be placed elsewhere, if desired. Suitably this engine may be of the air cooled type. Mounted above the engine is fuel tank 47. The crankshaft of the engine has a sprocket and centrifugal clutch keyed thereon, and is connected by means of an endless chain to a sprocket 48 adjacent one of the rear wheels. The vehicle is also equipped with starting means (not shown) which may be of the conventional recoil starter type commonly employed on air cooled motors.

Foot brake pedal 50 is mounted on the front end of the vehicle, and braking action is communicated to the rear wheels through brake rod 53 mounted along the tubular frame. The front end of the rod is secured to the lever of the brake pedal. The other end is fastened to a suitable lever (not shown) on brake shaft 57 which is mounted transversely of chassis 10 and having a lever extension 40 on which is mounted a removable tire engaging member 59.

It has been found that when smooth racing tires are employed, conventional flat tire engaging members are sometimes ineffective because stone, sand, etc., find their way between the tire and the tire engaging member, and thereby act as anti- friction bearings in effect.

I have found that the tire engaging member 59 shown in FIGURE 3 very satisfactorily overcomes this deficiency. The tire engaging member 59 shown in FIGURES 1 and 3 is made from a standard die spring which is of such a length that when the washer 11 and the cap screw 13 are secured to the lever extension 42 it will be under compression between the washer and the right angle bend of the extension 40, thus preventing it from rotating on lever 40.

It has been found that the spirals of the spring 59 provide a self cleaning action and no antifriction effect is encountered because of the sand particles mentioned above.

When conventional knobby tires are employed then the spring member 59 may be removed and replaced by a conventional smooth flat plate (not shown) which brakes against the tire being stopped, the treads of which then provide the self cleaning action.

In the foregoing description the term carting is frequently written in the trade as karting but for consistency, I have spelled this as carting.

It will also be appreciated that while this invention has filled a need in the carting field, it can also be advantageously employed on a variety of vehicles, as for example, golf carts, lawn mowers, and similar vehicles.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. In a cart type vehicle having a chassis and wheels, a brake comprising a member having wheel-engaging rib portions, said rib portions substantially lying in a plane extending at an angle transverse to the plane of the wheel, and means for moving said member into and out of engagement with one of said wheels.

2. In a cart type vehicle having a chassis and wheels, a brake comprising a wheel-engaging member in the shape of a helical coil, and means for moving said member into and out of engagement with a wheel, said member being substantially non-rotatable during said engagement.

References Cited by the Examiner
UNITED STATES PATENTS

| | | | |
|---|---|---|---|
| 767,299 | 8/1904 | MacDonald et al. | 188—19 |
| 1,386,120 | 8/1921 | Kuenneth | 188—74 |
| 1,998,236 | 4/1935 | Herold | 188—74 |
| 2,944,636 | 7/1960 | Rockwell | 188—29 |

MILTON BUSHLER, *Primary Examiner.*

DUANE A. REGER, ARTHUR L. LA POINT,
*Examiners.*